(12) United States Patent
Oodaira

(10) Patent No.: US 7,610,060 B2
(45) Date of Patent: Oct. 27, 2009

(54) MOBILE WIRELESS COMMUNICATION TERMINAL AND METHOD OF MATCHING ANTENNA IN THE SAME

(75) Inventor: Naoaki Oodaira, Saitama (JP)

(73) Assignee: NEC Corporation, Tokyo (JP)

( * ) Notice: Subject to any disclaimer, the term of this patent is extended or adjusted under 35 U.S.C. 154(b) by 647 days.

(21) Appl. No.: 11/092,562

(22) Filed: Mar. 29, 2005

(65) Prior Publication Data

US 2005/0215281 A1    Sep. 29, 2005

(30) Foreign Application Priority Data

Mar. 29, 2004   (JP)   ............... 2004-096358

(51) Int. Cl.
*H04M 1/00*   (2006.01)

(52) U.S. Cl. .............. 455/553.1; 455/552.1; 455/554.1; 455/78; 455/80; 455/83

(58) Field of Classification Search .............. 455/533.1, 455/552.1, 554.1, 78, 80, 82, 83, 835
See application file for complete search history.

(56) References Cited

U.S. PATENT DOCUMENTS

| | | | |
|---|---|---|---|
| 5,995,811 A | | 11/1999 | Watanabe |
| 6,198,441 B1 * | | 3/2001 | Okabe et al. ................. 343/702 |
| 6,219,532 B1 * | | 4/2001 | Tanaka et al. ................. 455/78 |
| 6,678,532 B1 * | | 1/2004 | Mizoguchi ............... 455/550.1 |
| 6,862,432 B1 * | | 3/2005 | Kim ............................. 455/80 |
| 6,934,557 B2 * | | 8/2005 | Sekine et al. ............ 455/550.1 |
| 2001/0002111 A1 * | | 5/2001 | Isobe .......................... 327/323 |
| 2005/0128162 A1 * | | 6/2005 | Takagi et al. ................ 343/895 |

FOREIGN PATENT DOCUMENTS

| | | |
|---|---|---|
| EP | 1 298 810 A2 | 4/2003 |
| GB | 2 382 954 | 6/2003 |
| JP | 03-119836 | 5/1991 |
| JP | 8-274727 | 10/1996 |
| JP | 10-4390 | 1/1998 |
| JP | 10-172087 | 6/1998 |
| JP | 11-205184 | 7/1999 |
| JP | 2000-36702 | 2/2000 |
| JP | 2001-257619 | 9/2001 |
| JP | 2001-358802 | 12/2001 |
| JP | 2002-118488 | 4/2002 |
| JP | 2003-69477 | 3/2003 |
| JP | 2003-115805 | 4/2003 |
| JP | 2003-332934 | 11/2003 |

* cited by examiner

*Primary Examiner*—Matthew D Anderson
*Assistant Examiner*—Adel Youssef
(74) *Attorney, Agent, or Firm*—Young & Thompson

(57) ABSTRACT

The mobile wireless communication terminal includes a first antenna, a second antenna, a signal-level detector which detects a level of a signal having been transmitted from the second antenna and having been received through the first antenna, and a matching unit which matches the first antenna by selecting a matching constant of the first antenna to optimize the signal-level detected by the signal-level detector.

16 Claims, 6 Drawing Sheets

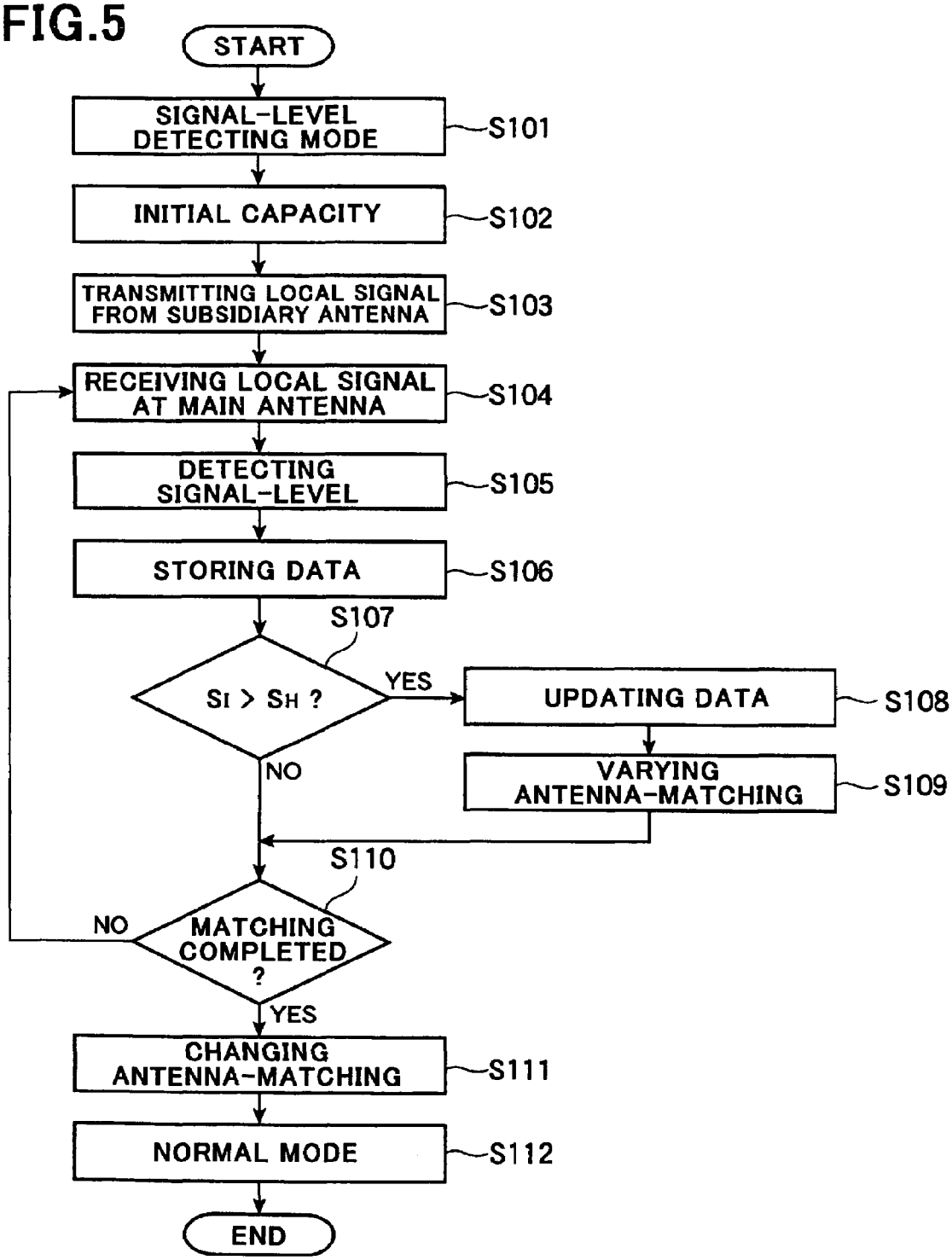

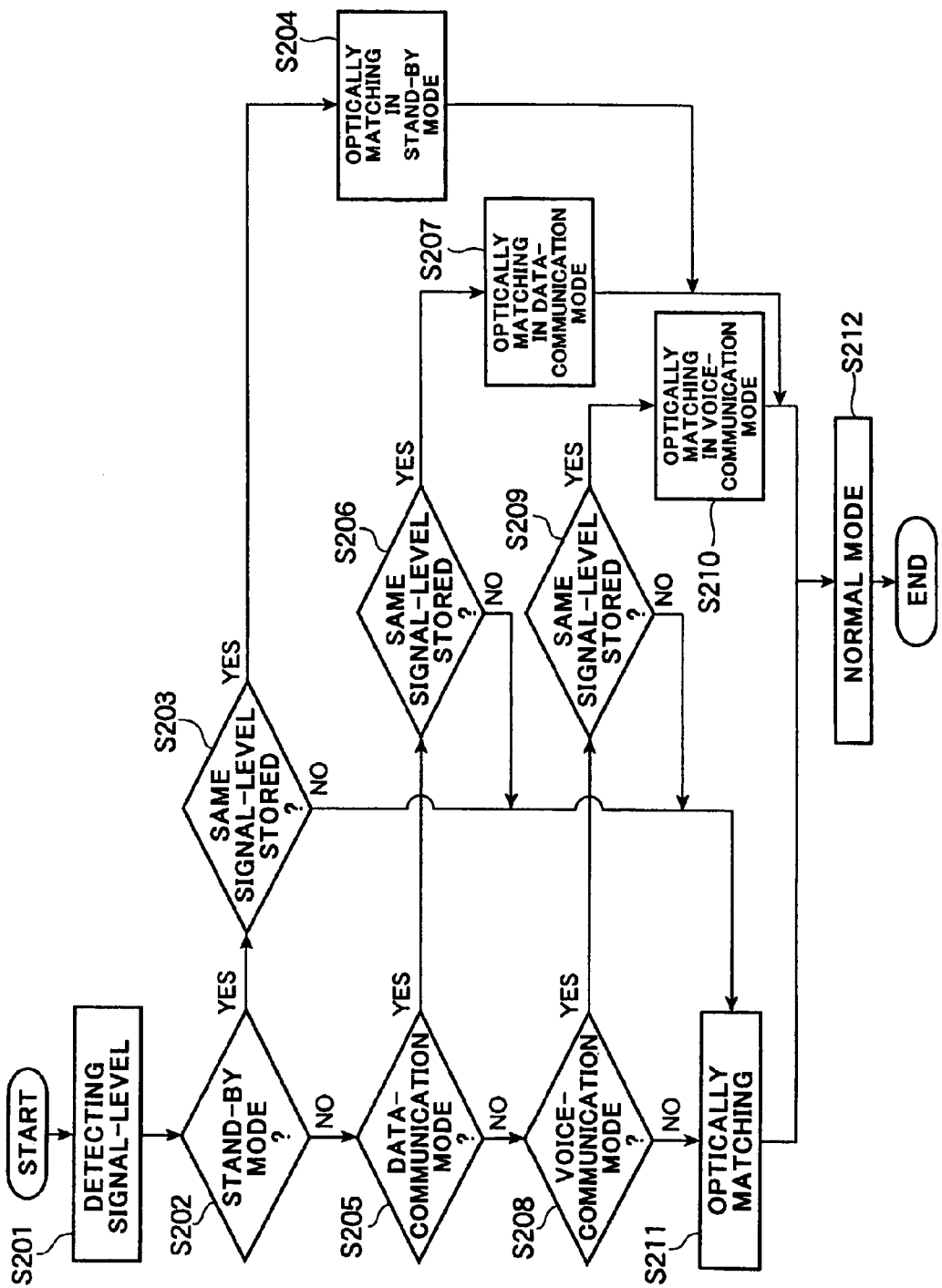

MOBILE WIRELESS COMMUNICATION TERMINAL AND METHOD OF MATCHING ANTENNA IN THE SAME

BACKGROUND OF THE INVENTION

1. Field of the Invention

The invention relates to a mobile wireless communication terminal, a method of matching an antenna in a mobile wireless communication terminal, and a program causing a computer to carry out the method.

2. Description of the Related Art

A mobile wireless communication terminal such as a mobile phone is generally designed to include a circuit for transmitting signals and a circuit for receiving signals.

FIG. 1 is a block diagram of a conventional circuit 1000 for transmitting and receiving signals. The circuit 1000 is equipped in a mobile phone.

As illustrated in FIG. 1, the conventional circuit 1000 includes a main antenna 10 and a subsidiary antenna 9. The main antenna 10 is mainly used, and the subsidiary antenna 9 is subsidiarily used.

A capacitor 11 is electrically connected at one end to the main antenna 10, and at the other end grounded. Similarly, an inductor 12 is electrically connected at one end to the main antenna 10, and at the other end grounded. The capacitor 11 and the inductor 12 match the main antenna 10.

A capacitor 8 is electrically connected at one end to the subsidiary antenna 9, and at the other end grounded. Similarly, an inductor 7 is electrically connected at one end to the subsidiary antenna 9, and at the other end grounded. The capacitor 8 and the inductor 7 match the subsidiary antenna 9.

Which antenna is used among the main and subsidiary antennas 10 and 9 is determined by a switch 6. Specifically, if the subsidiary antenna 9 is electrically connected to a later mentioned duplexer 5 through the switch 6, the subsidiary antenna 9 is in usable condition, and if the main antenna 10 is electrically connected to the duplexer 5 through the switch 6, the main antenna 10 is in usable condition.

The circuit 1000 further includes a radio-frequency integrated circuit (RFIC) 1 for modulating signals to be transmitted and extracting base band signals out of received signals, an analog base band (ABB) 16 receiving base band signals from the RFIC 1 and transmitting base band signals to the RFIC 1, and a temperature-compensated crystal oscillator (TCXO) 15 generating a reference frequency and transmitting the thus generated reference frequency to the RFIC 1.

The RFIC 1 includes a phase-locked loop (PLL) synthesizer 1a used in signal transmission, a voltage-controlled oscillator (VCO) 1b used in signal transmission, a mixer 1c used in signal transmission, a phase-locked loop (PLL) synthesizer 1d used in signal receipt, a voltage-controlled oscillator (VCO) 1e used in signal receipt, and a mixer 1f used in signal receipt.

The PLL synthesizer 1a and the VCO 1b transmit carrier waves in accordance with a reference frequency received from the TCXO 15. The mixer 1c modulates signals in accordance with both the carrier waves received from the VCO 1b and base band signals received from the ABB 16.

The circuit 1000 further includes a band pass filter 2 which allows signals having frequencies necessary for signal transmission among modulated signals received from the mixer 1c to pass therethrough, an amplifier 3 for amplifying the signals having passed the band pass filter 2, and an isolator 4 through which the signals having been amplified by the amplifier 3 are transmitted to a duplexer 5. The isolator 4 prevents signals to be transmitted to a signal-receipt circuit from being transmitted to a signal-transmission circuit.

The duplexer 5 provides signals having frequencies belonging to a signal-transmission band among signals received from the amplifier 3 through the isolator 4, to either the main antenna 10 or the subsidiary antenna 9 through the switch 6, and further provides signals having frequencies belonging to a signal-receipt band among signals received through the main antenna 10 and the subsidiary antenna 9, to a signal-receipt circuit including a low-noise amplifier 13 and a band pass filter 14 (both mentioned later).

The circuit 1000 further includes a low-noise amplifier 13 which amplifies signals received from the duplexer 5, and a band pass filter 14 which allows signals having frequencies belonging to a signal-receipt band among signals having been amplified by the low-noise amplifier 13, to pass the re through.

The PLL synthesizer id and the VCO 1e transmit local signals in accordance with a reference frequency received from the TCXO 15. The mixer if extracts base band signals out of signals received from the band pass filter 14, in accordance with the local signals received from the VCO 1e, and transmits the thus extracted base band signals to the ABB 16.

A path through which a signal to be transmitted runs and a path through which received signal runs are generally matched to have a resistance of 50 ohms, for instance, in order to maximize a power to be transmitted to loads.

In FIG. 1, in order to avoid complexity, the capacitors 8 and 11 and the inductors 7 and 12 are illustrated only in the vicinity of the antennas 9 and 10. However, it should be noted that other capacitors and inductors are actually arranged on other paths.

For instance, a circuit including a plurality of antennas such as the above-mentioned antenna 1000 is suggested in Japanese Patent Application Publications Nos. 7-147601 and 2001-111463. A mobile phone including a circuit for matching an impedance is suggested in Japanese Patent Application Publications Nos. 2001-345882, 2001-274652, and 2002-152078.

The conventional mobile wireless communication terminal is accompanied with a problem that, as illustrated in FIG. 2, a return loss and hence a signal-receipt sensitivity varies in dependence on a circumstance of the terminal. For instance, a return loss and hence signal-receipt sensitivity varies in dependence on whether the terminal is put on a desk or is put in a user's pocket. For instance, if the terminal is put in a user's bag, the terminal could not have sufficient signal-receipt sensitivity.

SUMMARY OF THE INVENTION

In view of the above-mentioned problem in the conventional mobile wireless communication terminal, it is an object of the present invention to provide a mobile wireless communication terminal capable of having optimal signal-receipt sensitivity in dependence on a circumstance of the mobile wireless communication terminal.

Hereinbelow are described the mobile wireless communication terminal, the method of matching an antenna in a mobile wireless communication terminal, and the program for causing a computer to carry out the method all in accordance with the present invention through the use of reference numerals used in later described embodiments. The reference numerals are indicated only for the purpose of clearly showing correspondence between claims and the embodiments. It should be noted that the reference numerals are not allowed to interpret of claims of the present application.

In one aspect of the present invention, there is provided a mobile wireless communication terminal including a first antenna (10), a second antenna (9), a signal-level detector (120) which detects a level of a signal having been transmitted from the second antenna (9) and having been received through the first antenna (10), and a matching unit (27, 28, 29, 32) which matches the first antenna (10) by selecting a matching constant of the first antenna (10) to optimize the signal-level detected by the signal-level detector (120).

It is preferable that the matching unit (27, 28, 29, 32) selects a matching constant ensuring an optimal signal-level, among signal-levels detected by the signal-level detector (120) in accordance with each of a plurality of matching constants.

The mobile wireless communication terminal may further include a memory (28) storing both reference signal-levels detected by the signal-level detector (120) when the matching constant is set equal to each of predetermined reference constants, and matching constants selected by the matching unit (27, 28, 29, 32) immediately before and immediately after the reference signal-levels are detected, each of the reference signal-levels being in correlation with each of the matching constants in the memory (28), in which case, the matching unit (27, 28, 29, 32) selects a matching constant in correlation with a newly detected reference signal-level in accordance with the correlation stored in the memory (28) between the reference signal-levels and the matching constants.

The mobile wireless communication terminal may further include a memory (28) storing reference signal-levels detected by the signal-level detector (120) when the matching constant is set equal to each of predetermined reference constants, matching constants selected by the matching unit (27, 28, 29, 32) immediately before and immediately after the reference signal-levels are detected, and an operation of the mobile wireless communication terminal made immediately before and immediately after the reference signal-levels are detected, in correlation with one another, in which case, the matching unit (27, 28, 29, 32) selects a matching constant in correlation with both a newly detected reference signal-level and an operation of the mobile wireless communication terminal in accordance with the correlation stored in the memory (28) among the reference signal-levels, the matching constants, and the operation of the mobile wireless communication terminal.

It is preferable that both the detection of the level of the signal and the matching the first antenna (10) are periodically repeatedly carried out.

It is preferable that the matching unit (27, 28, 29, 32) includes a variable capacitor (32), the matching unit (27, 28, 29, 32) matching the first antenna (10) by determining a capacity of the variable capacitor (32) as the matching constant.

It is preferable that the second antenna (9) transmits a local signal to be received by the first antenna (10), and the signal-level detector (120) detects a level of the local signal.

For instance, the signal-level detector (120) is comprised of an amplifier (22) which amplifies a signal received by the first antenna (10), a diode (23) having an anode into which the signal having been amplified by the amplifier (22) is transmitted, a capacitor (24) electrically connected at one end to a cathode of the diode (23) and at the other end grounded, a resistor (25) electrically connected at one end to a cathode of the diode (23) and at the other end grounded, and an A/D converter (26) which converts a signal output from the diode (23) through the cathode thereof into a digital form from an analogue form. The signal-level detector (120) detects a level of a signal having been A/D-converted by the A/D converter (26), as the level of the signal.

The mobile wireless communication terminal may further include an annunciator (106, 107) which annunciates a user that he/she improperly holds the mobile wireless communication terminal, when the level detected by the signal-level detector (120) is smaller than a predetermined threshold.

For instance, the mobile wireless communication terminal is comprised of a mobile phone (200).

In another aspect of the present invention, there is provided a method of matching a first antenna (10) in a mobile wireless communication terminal including a first antenna (10) and a second antenna (9), including (a) detecting a level of a signal having been transmitted from the second antenna (9) and having been received through the first antenna (10), and (b) matching the first antenna (10) by selecting a matching constant of the first antenna (10) to optimize the signal-level detected by the signal-level detector (120).

It is preferable that a matching constant ensuring an optimal signal-level is selected in the step (b) among signal-levels detected in accordance with each of a plurality of matching constants.

The method may further include storing both reference signal-levels detected when the matching constant is set equal to each of predetermined reference constants, and matching constants selected immediately before and immediately after the reference signal-levels are detected, each of the reference signal-levels being in correlation with each of the matching constants, wherein a matching constant in correlation with a newly detected reference signal-level is selected in the step (b) in accordance with the stored correlation between the reference signal-levels and the matching constants.

The method may further include storing (a) reference signal-levels detected when the matching constant is set equal to each of predetermined reference constants, (b) matching constants selected immediately before and immediately after the reference signal-levels are detected, and (c) an operation of the mobile wireless communication terminal made immediately before and immediately after the reference signal-levels are detected, in correlation with one another, wherein a matching constant in correlation with both a newly detected reference signal-level and an operation of the mobile wireless communication terminal is selected in the step (b) in accordance with the stored correlation among the reference signal-levels, the matching constants, and the operation of the mobile wireless communication terminal.

The method may further include periodically repeating the steps (a) and (b).

The method may further include annunciating a user that he/she improperly holds the mobile wireless communication terminal, when the level detected is smaller than a predetermined threshold.

In still another aspect of the present invention, there is provided a program for causing a computer to carry out the above-mentioned method of matching a first antenna (10) in a mobile wireless communication terminal including a first antenna (10) and a second antenna (9).

The advantages obtained by the aforementioned present invention will be described hereinbelow.

In accordance with the present invention, a level of a signal having been transmitted from the second antenna and having been received through the first antenna is detected, and a matching constant of the first antenna is selected so as to optimize the thus detected signal-level. Hence, it is possible to optimize signal-receipt sensitivity of the first antenna in accordance with a circumstance of the mobile wireless communication terminal. In addition, even when the first antenna is comprised of an antenna emitting a light on receipt of a signal, it would be possible to prevent degradation of the signal-receipt sensitivity.

The above and other objects and advantageous features of the present invention will be made apparent from the following description made with reference to the accompanying drawings, in which like reference characters designate the same or similar parts throughout the drawings.

BRIEF DESCRIPTION OF THE DRAWINGS

FIG. 5 is a flow-chart showing steps to be carried out by the circuit illustrated in FIG. 4.

FIG. 6 is a flow-chart showing steps to be carried out by the circuit illustrated in FIG. 4.

DESCRIPTION OF THE PREFERRED EMBODIMENTS

Preferred embodiments in accordance with the present invention will be explained hereinbelow with reference to drawings.

First Embodiment

In the first embodiment, the mobile wireless communication terminal in accordance with the present invention is applied to a mobile phone.

Figure 3:
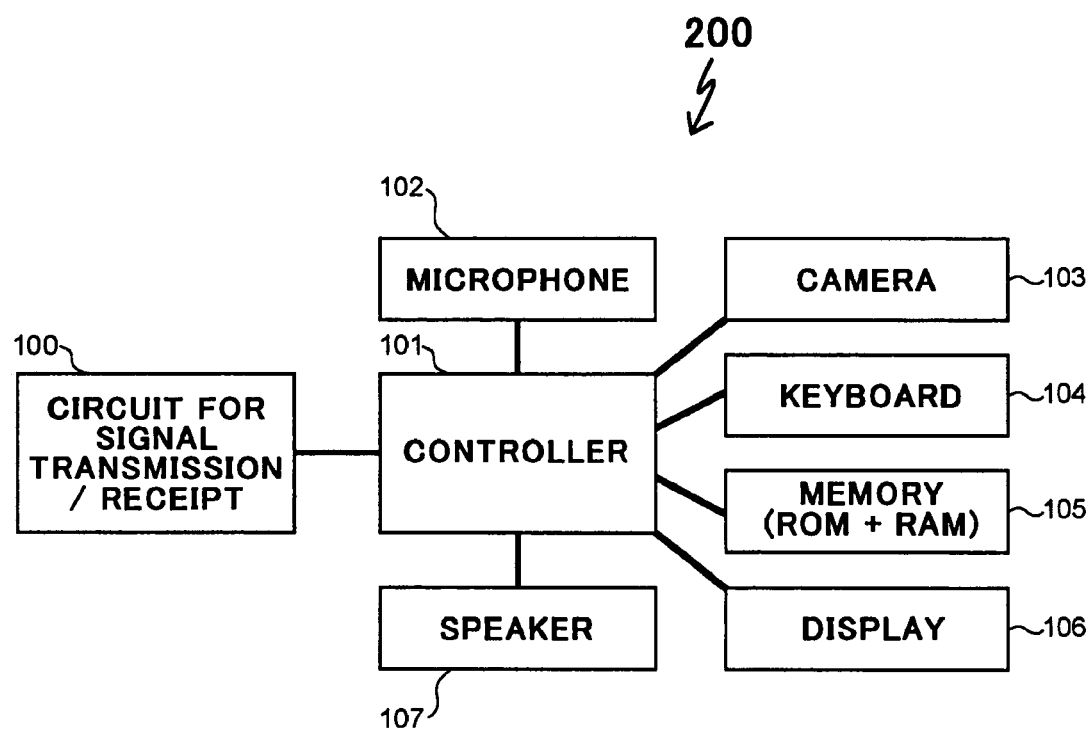
FIG. 3 is a block diagram of a mobile phone in accordance with the first embodiment of the present invention.

FIG. 3 is a block diagram of a mobile phone 200 in accordance with the first embodiment.

As illustrated in FIG. 3, the mobile phone 200 is comprised of a controller 101, a microphone 102, a camera 103, a keyboard 104, a memory 105, a display 106, a speaker 107, and a circuit 100 for transmitting and receiving signals.

The controller 101 controls operations of the microphone 102, the camera 103, the keyboard 104, the memory 105, the display 106, the speaker 107, and the circuit 100. For instance, the controller 101 is comprised of a central processing unit (CPU).

The microphone 102 receives voice-signals of a user in communication.

A user can input image data into the controller 101 through the camera 103. The camera 103 is used in taking a picture, or making TV-phone communication.

The keyboard 104 is comprised of a plurality of operational keys. A user can input data into the controller 101 through the keyboard 104.

The memory 105 is comprised of a read only memory (ROM) and a random access memory (RAM). The read only memory (ROM) stores therein a control program for controlling an operation of the controller 101. The controller 101 reads the control program out of the read only memory (ROM), and operates in accordance with the control program. The random access memory (RAM) provides the controller 101 with an area in which the controller 101 carries out operations.

The display 106 is comprised of a liquid crystal display device for displaying images. The display 106 displays characters such as letters and images such as pictures. The display 106 acts as a monitor in TV-phone communication.

The speaker 107 outputs voice signals in communication.

The circuit 100 transmits and receives radio signals, for instance, in accordance with W-CDMA.

Figure 4:
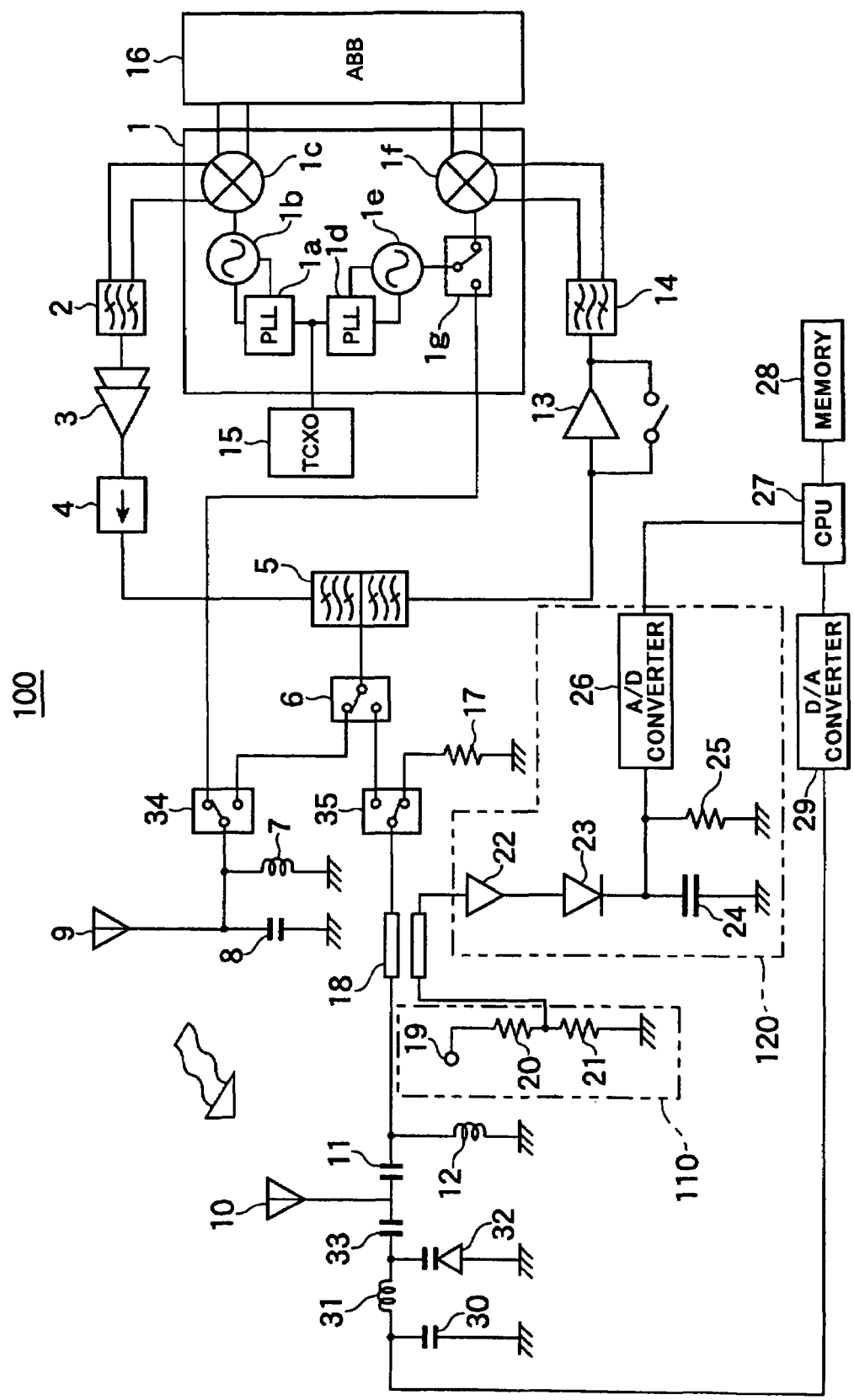
FIG. 4 is a block diagram of a circuit for transmitting and receiving signals, equipped in the mobile phone illustrated in FIG. 3.

FIG. 4 is a block diagram of the circuit 100 for transmitting and receiving signals, equipped in the mobile phone.

Parts or elements that correspond to those of the conventional circuit 1000 illustrated in FIG. 1 have been provided with the same reference numerals, and operate in the same manner as corresponding parts or elements in the conventional circuit, unless explicitly explained hereinbelow.

As illustrated in FIG. 4, the circuit 100 includes a main antenna 10 and a subsidiary antenna 9. The main antenna 10 is mainly used, and the subsidiary antenna 9 is subsidiarily used.

A capacitor 8 is electrically connected at one end to the subsidiary antenna 9, and at the other end grounded. Similarly, an inductor 7 is electrically connected at one end to the subsidiary antenna 9, and at the other end grounded. The capacitor 8 and the inductor 7 match the subsidiary antenna 9.

A capacitor 11 is electrically connected at one end to the main antenna 10, and at the other end to an end of an inductor 12. The inductor 12 is grounded at the other end. A capacitor 33 is electrically connected at one end to the main antenna 10, and at the other end to both an end of an inductor 31 and a cathode of a variable diode 32. The variable diode 32 is grounded at the other end. The inductor 31 is electrically connected at the other end to both an end of a capacitor 30 and a later-mentioned D/A converter 29. The capacitor 30 is grounded at the other end.

The capacitors 11, 33 and 30, the inductors 12 and 31, and the variable diode 32 match the main antenna 10. Specifically, the main antenna 10 is matched by selecting a desired electrostatic capacity of the variable diode 32, as explained in detail later. In the first embodiment, an electrostatic capacity of the variable diode 32 is defined as a matching constant of the main antenna 10.

Figure 1:
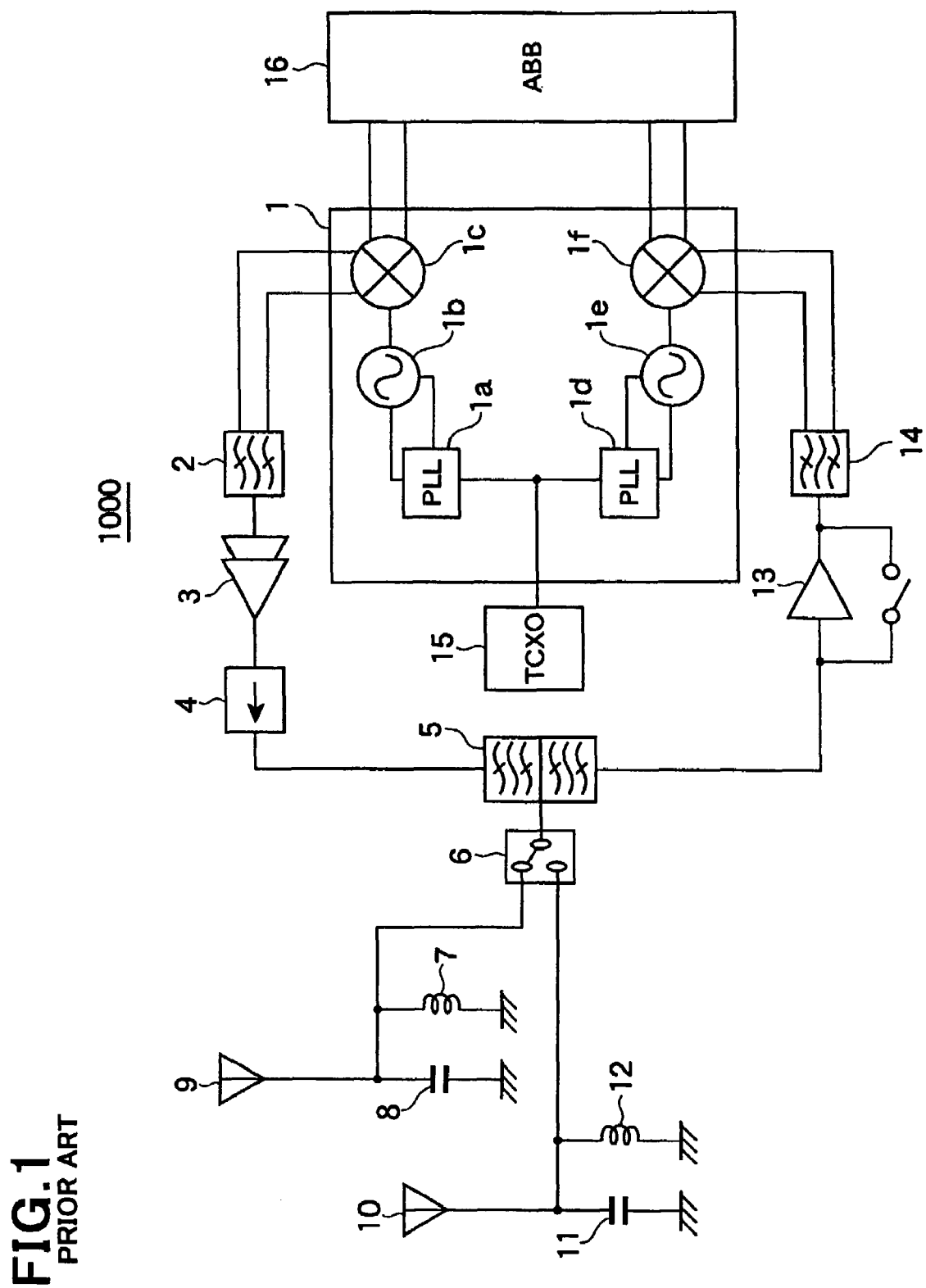
FIG. 1 is a block diagram of a conventional circuit for transmitting and receiving signals, equipped in a mobile phone.
Figure 2:
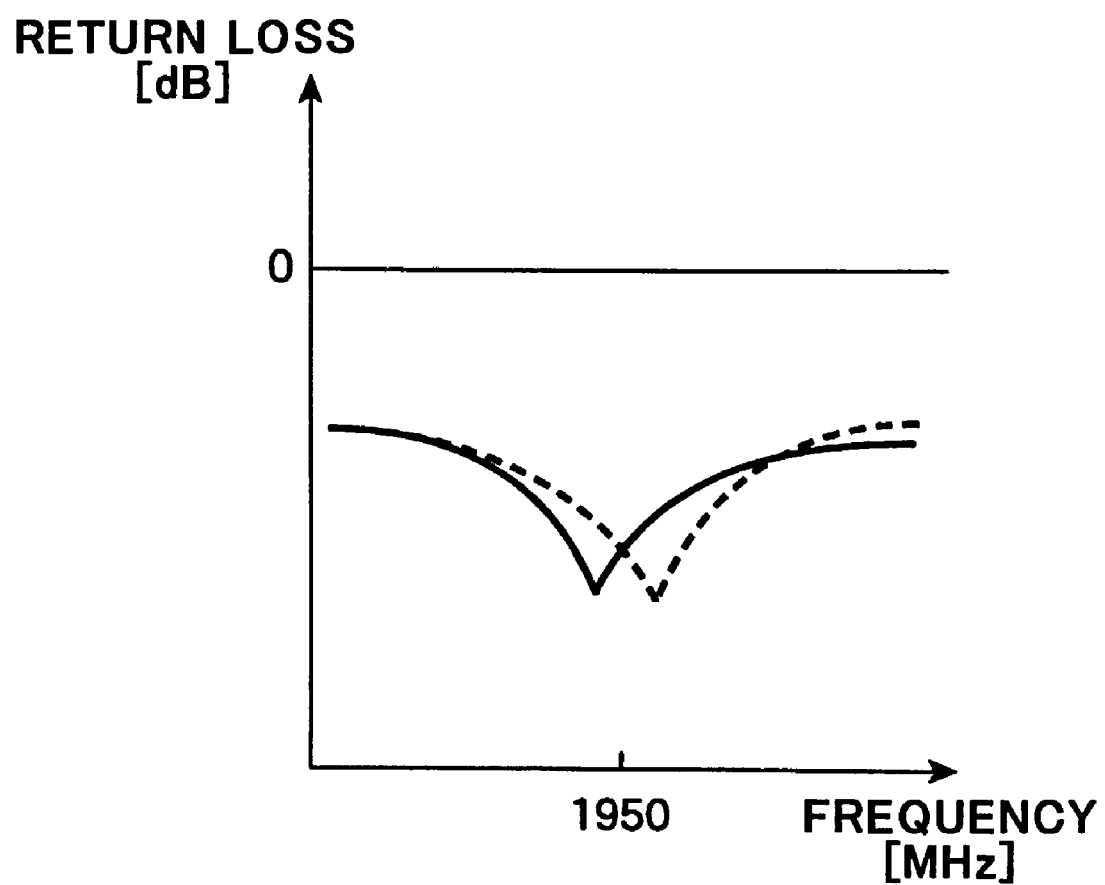
FIG. 2 is a graph of antenna characteristics of a conventional mobile phone, showing that a return loss varies in dependence on how a user holds the mobile phone.

The RFIC 1 of the circuit 100 additionally includes, in comparison with the RFIC 1 of the circuit 1000 illustrated in FIG. 1, a first switch 1g arranged between the PLL synthesizer 1e and the mixer if, and a second switch 34 arranged between the first switch 1g, the switch 6, and a node through which the inductor 7 and the capacitor 8 are electrically connected.

The first switch 1g electrically connects the VCO 1e to either the mixer if or the second switch 34.

The second switch electrically connects the subsidiary antenna 9 to either the first switch 1g or the switch 6.

The VCO 1e transmits local signals to the subsidiary antenna 9 through the first and second switches 1g and 34. Specifically, the VCO 1e can transmit local signals to the subsidiary antenna 9 by setting the first switch 1g to electrically connect the VCO 1e to the second switch 34 and setting the second switch 34 to electrically connect the first switch 1g to the subsidiary switch 9.

The circuit 100 further includes a coupler 18 and a third switch 35 in this order between the main antenna 10 and the switch 6 in order to allow signals received at the main antenna 19 to be transmitted to the duplexer 5.

The coupler 18 couples a path through which signals received at the main antenna 10 run and a path of a later-mentioned signal-level detecting circuit 120, to each other.

The third switch 35 electrically connects the main antenna 10 to either the switch 6 or a resistor 17 grounded at one end. For instance, the resistor 17 has a resistance of 50 ohms.

The coupler 18 is electrically connected to a bias-voltage providing circuit 100 comprised of a power-source voltage (Vcc) 19, a first resistor 20, and a second resistor 21. The first and second resistors 20 and 21 act as a voltage divider, that is, divide the power-source voltage (Vcc) 19.

The first and second resistors 20 and 21 are electrically connected in series to the power-source voltage 19. The second resistor 21 arranged remoter from the power-source voltage (Vcc) 19 than the first resistor 20 is grounded at one end. The coupler 18 is electrically connected to a node through which the second resistor 21 is electrically connected at the other end to the first resistor 20.

The coupler 18 is electrically connected further to a signal-level detecting circuit 120 comprised of an amplifier 22, a diode 23, a capacitor 24, a resistor 25, and an analog-digital (A/D) converter 26.

Specifically, the coupler 18 is electrically connected to the A/D converter 26 through the amplifier 22 and the diode 23. The capacitor 24 is electrically connected at one end to a node through which the diode 23 and the A/D converter 26 are electrically connected to each other, and grounded at the other end. The resistor 25 is electrically connected at one end to the node, and grounded at the other end.

The bias-voltage providing circuit 110 provides a bias-voltage to the diode 23 to improve non-linear strain of the diode 23.

The signal-level detecting circuit 120 detects a level of signals received through the main antenna 10.

The circuit 100 further includes a central processing unit (CPU) 27, a digital-analog (D/A) converter 29, and a memory 28.

The CPU 27 is electrically connected to the A/D converter 26, the D/A converter 29, and the memory 28.

The memory 28 is comprised of a read only memory (ROM) and a random access memory (RAM). The read only memory (ROM) stores therein a control program for controlling an operation of the CPU 27. The CPU 27 reads the control program out of the read only memory (ROM), and operates in accordance with the control program. The random access memory (RAM) provides the CPU 27 with an area in which the CPU 27 carries out operations.

Furthermore, the memory 28 stores, under control of the CPU 27, correlation between a matching constant and a signal level corresponding to a reference matching constant, and correlation among a matching constant, a signal level corresponding to a reference matching constant, and an operation of the mobile phone 200.

The D/A converter 29 is electrically connected through the inductor 31 to the variable capacitor 32 through which a matching constant of the main antenna 10 is determined.

FIGS. 5 and 6 are flow-charts each showing steps to be carried out by the circuit 100.

Hereinbelow is explained an operation of the circuit 100 with reference to FIGS. 5 and 6.

In step S101, in accordance with control signals transmitted from the CPU 27, the first to third switches 1g, 34 and 35 are operated. Specifically, the VCO 1e is electrically connected to the second switch 34 through the first switch 1g, the subsidiary antenna 9 is electrically connected to the first switch 1g through the second switch 34, and the main antenna 10 is electrically connected to the resistor 17 through the third switch 35. Thus, the circuit 100 is put into a mode for detecting a level of signals received through the main antenna 10.

A signal-level is represented with a unit "dBm". A unit "dBm" is expressed in logarithm on the basis of the equation "1 mW=−0 dBm". 1 dBm is defined as follows.

$$1\ \mathrm{dBm} = 10\ \log_{10}(1/1\ \mathrm{mW})$$

Then, in step S102, the variable diode 32 is set to have an electrostatic capacity equal to an initial capacity optimal in free space. Herein, "free space" means space in which the variable diode 32 is not influenced by anything such as a user of the mobile phone 200, and "an initial capacity" means a default capacity determined when the mobile phone 200 is shipped from a factory.

An electrostatic capacity of the variable diode 32, that is, a matching constant of the main antenna 10 is determined by setting an output voltage of the D/A converter 29 under control of the CPU 27.

Then, in step S103, a local signal output from the VCO 1e is transmitted from the subsidiary antenna 9 through the first and second switches 1g and 34.

Then, in step S104, the local signal transmitted from the subsidiary antenna 9 is received by the main antenna 10. Since the main antenna 10 is electrically connected to the resistor 17 through the third switch 35, the local signal having been received by the main antenna 10 does not run to a signal-receipt circuit (the duplexer 5→the low-noise amplifier 13→the band pass filter 14→RFIC 1), but is all absorbed into the 50-ohm resistor 17.

Then, in step S105, the signal-level is detected. Specifically, the local signal having been received through the main antenna 10 is transmitted to the signal-level detecting circuit 120 through the coupler 18, amplified by the amplifier 22, and then, detected by the diode 23.

When an input signal Vi is input into the diode 23 through an anode thereof, a detection current $I_D$ runs through the diode 23, resulting in that electric charges are accumulated in the capacitor 24 in accordance with the detection current $I_D$. The electric charges accumulated in the capacitor 24 are discharged through the resistor 25 in a half cycle of the input signal Vi, and appear again at opposite ends of the resistor 25 as detection matching current and voltage. The A/D converter 26 converts the detection matching current and voltage into a digital form from an analog form. Thus, a level of the signals received through the main antenna 10 is expressed in a digital form, and hence, the CPU 27 can recognize the signal-level.

After the detection of the signal-level, the CPU 27 operates as follows.

The CPU 27 stores the electrostatic capacity of the variable diode 32 obtained in the detection of the signal-level, and the detected signal-level into the memory in step S106.

Then, the CPU 27 compares a latest signal-level with the best or highest signal-level among the signal-levels stored in the memory 28, in step S107. Specifically, the CPU 27 judges whether a latest signal-level $S_1$ is higher than the highest signal-level $S_H$ stored in the memory 28, in step S107.

If the latest signal-level $S_1$ is higher than the highest signal-level $S_H$ (YES in step S107), the CPU 27 stores the highest signal-level $S_H$ to update the memory 28, in step S108.

Then, the CPU 27 varies a matching constant of the main antenna 10 by varying an electrostatic capacity of the variable diode 32 in accordance with the new highest signal-level, in step S109. Specifically, the CPU 27 varies an output voltage of the D/A converter 29 in accordance with the new highest signal-level, and an electrostatic capacity of the variable diode 32 is varied in accordance with the output voltage transmitted from the D/A converter 29.

If the latest signal-level $S_1$ is not higher than the highest signal-level $S_H$ (NO in step S107), the CPU 27 does not rearrange the matching of the main antenna 10, that is, the CPU 27 keeps an electrostatic capacity of the variable diode 32 unchanged.

The above-mentioned steps S104 to S109 are repeated until each of the detected signal-levels is recognized for all electrostatic capacities of the variable diode 32.

Specifically, in step S110 following step S107 or S109, the CPU 27 checks whether a signal-level is recognized for all electrostatic capacities of the variable diode 32, that is, whether the matching of the main antenna 10 is completed.

If the CPU 27 judges that the matching of the main antenna 10 is not completed (NO in step S110), steps S104 to S109 are repeatedly carried out until the CPU 27 judges that the matching of the main antenna 10 is completed.

If the CPU 27 judges that the matching of the main antenna 10 is completed (YES in step S110), the CPU 27 sets the variable diode 32 to have an electrostatic capacity which ensures the highest signal-level, in step S111. Specifically, the CPU 27 selects an electrostatic capacity ensuring the highest signal-level among the signal-levels detected by repeatedly carrying out the above-mentioned steps S104 to S109.

Thus, the CPU 27, the memory 28, the D/A converter 29 and the variable diode 32 define a matching unit for matching the main antenna 10.

Then, in step S112, in accordance with control signals transmitted from the CPU 27, the first to third switches 1g, 34 and 35 are operated. Specifically, the VCO 1e is electrically connected to the mixer 1f through the first switch 1g, the subsidiary antenna 9 is electrically connected to the switch 6 through the second switch 34, and the main antenna 10 is electrically connected to the switch 6 through the third switch 35. Thus, the circuit 100 is put back into a normal mode.

By carrying out the above-mentioned operation, it is possible to optimize an electrostatic capacity of the variable diode 32 in dependence on a circumstance of the mobile phone 200 regardless of a condition of the mobile phone 200 (for instance, regardless of whether the mobile phone 200 is put on a desk or in a pocket).

In general, a user holds the mobile phone 200 in different ways in dependence on an operation of the mobile phone 200 (for instance, voice communication, data communication other than voice communication, or a stand-by mode).

Hence, the CPU 27 correlates (a) the signal-level detected when an electrostatic capacity or a matching constant of the variable diode 32 is set to be an initial capacity, (b) an electrostatic capacity of the variable diode 32 as an optimal antenna matching constant immediately after the detection of the above-mentioned signal-level, and (c) an operation of the mobile phone 200 made immediately after the detection of the above-mentioned signal-level (for instance, voice communication, data communication other than voice communication, or a stand-by mode), with one another, and stores the correlations for each of operations of the mobile phone 200. As a result, as mentioned hereinbelow, it is possible to promptly select an optimal matching constant.

FIG. 6 is a flowchart showing steps to be carried out for selecting an optimal matching constant in dependence on an operation of the mobile phone 200 among matching constants stored in the memory 28.

The steps similar to the steps S101 to S105 illustrated in FIG. 5 are carried out in step S201. That is, a signal-level is detected when an electrostatic capacity (a matching constant) of the variable diode 32 is newly set to be an initial capacity.

Then, a current operation of the mobile phone 200 is detected.

First, the CPU 27 judges whether the mobile phone 200 is in a stand-by mode in step S202.

If the mobile phone 200 is in a stand-by mode (YES in step S202), the CPU 27 retrieves the signal-levels stored in the memory 28 to check whether a signal-level almost identical with the signal-level detected in step S201 is stored in the memory 28 in correlation with a stand-by mode of the mobile phone 200, in step S203.

If such a signal-level is found in the memory 28 (YES in step S203), the CPU 27 sets the variable diode 32 to have the electrostatic capacity stored in the memory 28 in correlation with the detected signal-level, in step S204. Thus, an optimal matching constant in a stand-by mode of the mobile phone 200 is selected.

Then, the CPU 27 puts the circuit 100 back to a normal mode in step S212, similarly to the above-mentioned step S112. Thus, the procedure of selecting an optimal matching constant is completed.

If the mobile phone 200 is not in a stand-by mode (NO in step S202), the CPU 27 judges whether the mobile phone 200 is in a data communication mode other than a voice communication mode (for instance, communication for transmitting and receiving image data), in step S205.

If the mobile phone 200 is in a data communication mode other than a voice communication mode (YES in step S205), the CPU 27 retrieves the signal-levels stored in the memory 28 to check whether a signal-level almost identical with the signal-level detected in step S201 is stored in the memory 28 in correlation with a data communication (except voice communication) mode of the mobile phone 200, in step S206.

If such a signal-level is found in the memory 28 (YES in step S206), the CPU 27 sets the variable diode 32 to have the electrostatic capacity stored in the memory 28 in correlation with the detected signal-level, in step S207. Thus, an optimal matching constant in a data communication (except voice communication) mode of the mobile phone 200 is selected.

Then, the CPU 27 puts the circuit 100 back to a normal mode in step S212, similarly to the above-mentioned step S112. Thus, the procedure of selecting an optimal matching constant is completed.

If the mobile phone 200 is not in a data communication (except voice communication) mode (NO in step S205), the CPU 27 judges whether the mobile phone 200 is in a voice communication mode, in step S208.

If the mobile phone 200 is in a voice communication mode (YES in step S208), the CPU 27 retrieves the signal-levels stored in the memory 28 to check whether a signal-level almost identical with the signal-level detected in step S201 is stored in the memory 28 in correlation with a voice communication mode of the mobile phone 200, in step S209.

If such a signal-level is found in the memory 28 (YES in step S209), the CPU 27 sets the variable diode 32 to have the electrostatic capacity stored in the memory 28 in correlation with the detected signal-level, in step S210. Thus, an optimal matching constant in a voice communication mode of the mobile phone 200 is selected.

Then, the CPU 27 puts the circuit 100 back to a normal mode in step S212, similarly to the above-mentioned step S112. Thus, the procedure of selecting an optimal matching constant is completed.

If the mobile phone 200 is not in a voice communication mode (NO in step S208), the CPU 27 carries out the steps S104 to S111 illustrated in FIG. 5 in order to select an optimal matching constant, in step S211.

Similarly, If the above-mentioned signal-level is not found in the memory 28 (NO in steps S203, S206 and S209), the CPU 27 carries out the steps S104 to S110 in order to select an optimal matching constant, in step S211.

After carrying out step S211, the CPU 27 puts the circuit 100 back to a normal mode in step S212.

The CPU 27 periodically carries out the steps S201 to S212. In other words, the circuit 100 is designed to select an optimal matching constant every predetermined period of time.

The mobile phone 200 in accordance with the first embodiment provides the following advantages.

In the mobile phone 200, the signal-level detecting circuit 120 detects a level of a signal transmitted from the subsidiary antenna 9 and received at the main antenna 10, and the matching unit comprised of the CPU 27, the memory 28, the D/A converter 29 and the variable diode 32 selects such a matching constant of the main antenna 10 that the signal-level detected by the signal-level detecting circuit 120 is optimal. Accordingly, it is possible to optimize the signal-receipt sensitivity of the main antenna 10 in accordance with a circumstance of the mobile phone 200.

In addition, even when the main antenna 10 is comprised of an antenna emitting a light on receipt of a signal, it would be possible to prevent degradation of the signal-receipt sensitivity.

Since the CPU 27 periodically selects an optimal matching constant, the main antenna 10 is kept optimally matched, ensuring sufficient signal-receipt sensitivity.

Furthermore, since the memory 28 stores an electrostatic capacity of the variable diode 32 which ensures a matching constant optimal to an operation (for instance, a stand-by mode, a data communication mode or a voice communication mode) of the mobile phone 200, it is possible to optimally match the main antenna 10 in accordance with a mode of the mobile phone 200 by carrying out the steps shown in FIG. 6.

Second Embodiment

The mobile phone in accordance with the second embodiment is designed to include an annunciator which annunciates a user that he/she improperly holds the mobile phone, when a signal-level detected by the signal-level detecting circuit 120 is smaller than a threshold signal-level.

For instance, the annunciator may be comprised of the speaker 107 (see FIG. 3) or a combination of the speaker 107 and the display 106.

The memory 28 in the second embodiment stores therein a threshold signal-level. The CPU 27 judges whether a detected signal-level is smaller than the threshold signal-level stored in the memory 28, in steps S203, S206 and S209. If the CPU 27 judges that a detected signal-level is smaller than the threshold signal-level, the CPU 27 transmits a notification signal to the controller 101. On receipt of the notification signal from the CPU 27, the controller 101 causes the speaker 107 to make sound, for instance.

A threshold signal-level may be common to all operations of the mobile phone 200, or may be different from one another for each of operations of the mobile phone 200.

In accordance with the second embodiment, the mobile phone includes the annunciator to annunciate a user that he/she improperly holds the mobile phone, when a signal-level detected by the signal-level detecting circuit 120 is smaller than a threshold signal-level. Being annunciated, a user properly holds the mobile phone to have the highest signal-level.

The mobile wireless communication terminal in accordance with the present invention is applied to a mobile phone in the first and second embodiments. However, it should be noted that the present invention may be applied to other mobile wireless communication terminals such as a personal handy phone system (PHS) or a mobile personal digital assistant (PDA).

Furthermore, the present invention may be applied to a mobile wireless communication terminal including three or more antennas, in which case, any two antennas among the three or more antennas are used to detect a signal-level in the same way as the above-mentioned first and second embodiments.

In the first embodiment, the main antenna 10 is matched by selecting an optimal electrostatic capacity of the variable diode 32. As an alternative, the main antenna 10 may be matched by varying characteristic of a passive device. As an alternative, the circuit 100 may be designed to include either a plurality of devices such as a capacity and an inductor, or a plurality of groups of devices such as a group of a capacitor and an inductor, in which case, one of devices or one of groups is selected through a switch.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 2004-096358 filed on Mar. 29, 2004 including specification, claims, drawings and summary is incorporated herein by reference in its entirety.

What is claimed is:

1. A mobile wireless communication terminal comprising:
    a first antenna;
    a second antenna;
    a signal-level detector which detects a level of a signal having been transmitted from said second antenna and having been received through said first antenna;
    a matching unit which matches said first antenna by selecting a matching constant of said first antenna to optimize said signal-level detected by said signal-level detector, said matching unit selects a matching constant ensuring an optimal signal-level, among signal-levels detected by said signal-level detector in accordance with each of a plurality of matching constants; and
    a memory storing both reference signal-levels detected by said signal-level detector when said matching constant is set equal to each of predetermined reference constants, and matching constants selected by said matching unit immediately before and immediately after said reference signal-levels are detected, each of said reference signal-levels being in correlation with each of said matching constants in said memory,
    wherein said matching unit selects a matching constant in correlation with a newly detected reference signal-level in accordance with the correlation stored in said memory between said reference signal-levels and said matching constants.

2. The mobile wireless communication terminal as set forth in claim 1, further comprising a memory storing reference signal-levels detected by said signal-level detector when said matching constant is set equal to each of predetermined reference constants, matching constants selected by said matching unit immediately before and immediately after said reference signal-levels are detected, and an operation of said mobile wireless communication terminal made immediately before and immediately after said reference signal-levels are detected, in correlation with one another, and wherein said matching unit selects a matching constant in correlation with both a newly detected reference signal-level and an operation of said mobile wireless communication terminal in accordance with the correlation stored in said memory among said reference signal-levels, said matching constants, and said operation of said mobile wireless communication terminal.

3. The mobile wireless communication terminal as set forth in claim 1, wherein both the detection of said level of said signal and the matching said first antenna are periodically repeatedly carried out.

4. The mobile wireless communication terminal as set forth in claim 1, wherein said matching unit includes a variable capacitor, said matching unit matching said first antenna by determining a capacity of said variable capacitor as said matching constant.

5. The mobile wireless communication terminal as set forth in claim 1, wherein said second antenna transmits a local signal to be received by said first antenna, and said signal-level detector detects a level of said local signal.

6. The mobile wireless communication terminal as set forth in claim 1, wherein said signal-level detector is comprised of:
an amplifier which amplifies a signal received by said first antenna;
a diode having an anode into which said signal having been amplified by said amplifier is transmitted;
a capacitor electrically connected at one end to a cathode of said diode and at the other end grounded;
a resistor electrically connected at one end to a cathode of said diode and at the other end grounded; and
an A/D converter which converts a signal output from said diode through said cathode thereof into a digital form from an analogue form,
said signal-level detector detecting a level of a signal having been A/D-converted by said A/D converter, as said level of said signal.

7. The mobile wireless communication terminal as set forth in claim 1, further comprising an annunciator which annunciates a user that he/she improperly holds said mobile wireless communication terminal, when said level detected by said signal-level detector is smaller than a predetermined threshold.

8. The mobile wireless communication terminal as set forth in claim 1, wherein said mobile wireless communication terminal is comprised of a mobile phone.

9. A method of matching a first antenna in a mobile wireless communication terminal including a first antenna and a second antenna, comprising:
(a) detecting a level of a signal having been transmitted from said second antenna and having been received through said first antenna;
(b) matching said first antenna by selecting a matching constant of said first antenna to optimize said signal-level detected by said signal-level detector a matching constant ensuring an optimal signal-level is selected among signal-levels detected in accordance with each of a plurality of matching constants; and
(c) storing both reference signal-levels detected when said matching constant is set equal to each of predetermined reference constants, and matching constants selected immediately before and immediately after said reference signal-levels are detected, each of said reference signal-levels being in correlation with each of said matching constants,
wherein a matching constant in correlation with a newly detected reference signal-level is selected in said step (b) in accordance with the stored correlation between said reference signal-levels and said matching constants.

10. The method as set forth in claim 9, further comprising storing (a) reference signal-levels detected when said matching constant is set equal to each of predetermined reference constants, (b) matching constants selected immediately before and immediately after said reference signal-levels are detected, and (c) an operation of said mobile wireless communication terminal made immediately before and immediately after said reference signal-levels are detected, in correlation with one another,
wherein a matching constant in correlation with both a newly detected reference signal-level and an operation of said mobile wireless communication terminal is selected in said step (b) in accordance with the stored correlation among said reference signal-levels, said matching constants, and said operation of said mobile wireless communication terminal.

11. The method as set forth in claim 9, further comprising periodically repeating said steps (a) and (b).

12. The method as set forth in claim 9, further comprising annunciating a user that he/she improperly holds said mobile wireless communication terminal, when said level detected is smaller than a predetermined threshold.

13. A read-only memory with a computer program stored thereon for causing a computer to carry out a method of matching a first antenna in a mobile wireless communication terminal including a first antenna and a second antenna, steps executed by said computer in accordance with said program including:
(a) detecting a level of a signal having been transmitted from said second antenna and having been received through said first antenna;
(b) matching said first antenna by selecting a matching constant of said first antenna to optimize said signal-level detected by said signal-level detector, a matching constant ensuring an optimal signal-level is selected among signal-levels detected in accordance with each of a plurality of matching constants; and
(c) storing both reference signal-levels detected when said matching constant is set equal to each of predetermined reference constants, and matching constants selected immediately before and immediately after said reference signal-levels are detected, each of said reference signal-levels being in correlation with each of said matching constants,
wherein a matching constant in correlation with a newly detected reference signal-level is selected in said step (b) in accordance with the stored correlation between said reference signal-levels and said matching constants.

14. The read-only memory with a computer program as set forth in claim 13, wherein said steps further include storing (a) reference signal-levels detected when said matching constant is set equal to each of predetermined reference constants, (b) matching constants selected immediately before and immediately after said reference signal-levels are detected, and (c) an operation of said mobile wireless communication terminal made immediately before and immediately after said reference signal-levels are detected, in correlation with one another,
wherein a matching constant in correlation with both a newly detected reference signal-level and an operation of said mobile wireless communication terminal is selected in said step (b) in accordance with the stored correlation among said reference signal-levels, said matching constants, and said operation of said mobile wireless communication terminal.

15. The read-only memory with a computer program as set forth in claim 13, wherein said steps further include periodically repeating said steps (a) and (b).

16. The read-only memory with a computer program as set forth in claim 13, wherein said steps further include annunciating a user that he/she improperly holds said mobile wireless communication terminal, when said level detected is smaller than a predetermined threshold.

* * * * *

UNITED STATES PATENT AND TRADEMARK OFFICE
CERTIFICATE OF CORRECTION

PATENT NO. : 7,610,060 B2
APPLICATION NO. : 11/092562
DATED : October 27, 2009
INVENTOR(S) : Naoaki Oodaira Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1224 days.

Signed and Sealed this

Twelfth Day of October, 2010

David J. Kappos
*Director of the United States Patent and Trademark Office*